Figure 1:
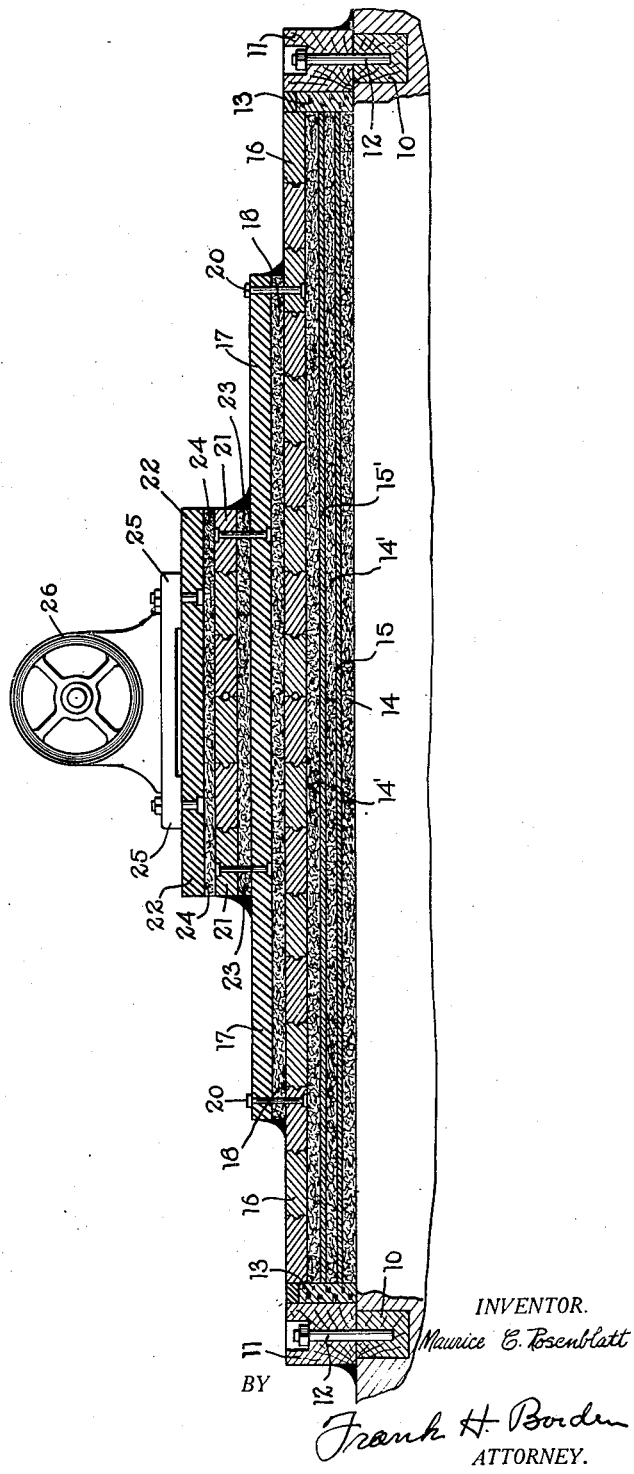

Aug. 18, 1931.     M. C. ROSENBLATT     1,819,039
ISOLATING SUPPORT FOR VIBRATORY EQUIPMENT
Filed Sept. 1, 1927     3 Sheets-Sheet 2

INVENTOR
Maurice C. Rosenblatt
BY
Frank H. Borden
ATTORNEY

Aug. 18, 1931.      M. C. ROSENBLATT      1,819,039
ISOLATING SUPPORT FOR VIBRATORY EQUIPMENT
Filed Sept. 1, 1927      3 Sheets-Sheet 3

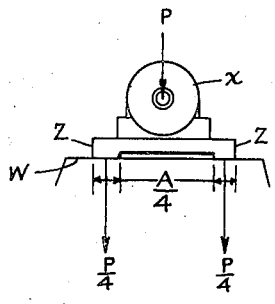

P = Total Implied Force
A = Area of Motor Supports
U = Unit Implied Force $$U = \frac{P/4 \times 4}{A} = \frac{P}{A}$$

Fig. 4.

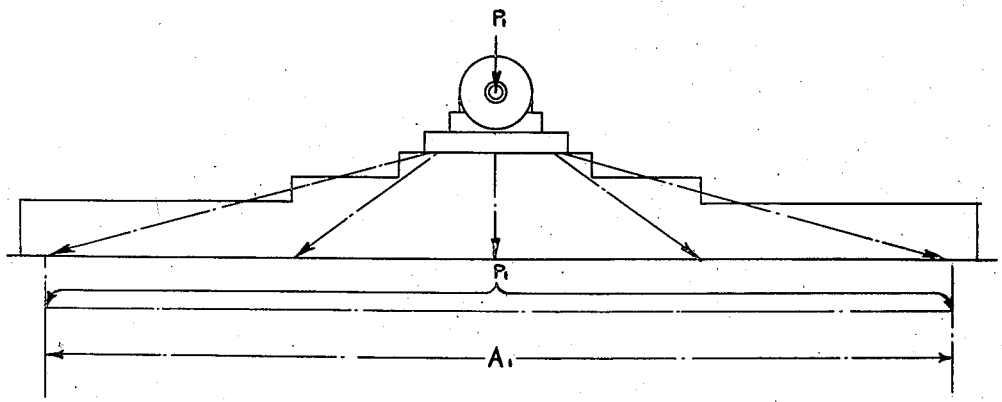

$P_1$ = Total Implied Force
$A_1$ = Area of Support
$A_1 = 50A \pm$
$U_1$ = Unit Implied Force
$U_1 = \frac{P_1}{A_1} = \frac{P_1}{50A}$
$U_1 = .02 U$ Either P or $P_1$ = Total Of All Forces Acting.
(Dead Load) (Potential) Live Load
(Kinetic) Forces Of Unbalance - Forces
Of Magnetism - Forces Of Resonance.)

Fig. 5.

Inventor
Maurice C. Rosenblatt.

By  Frank H. Borden
Attorney

Patented Aug. 18, 1931

1,819,039

UNITED STATES PATENT OFFICE

MAURICE C. ROSENBLATT, OF PHILADELPHIA, PENNSYLVANIA

ISOLATING SUPPORT FOR VIBRATORY EQUIPMENT

Application filed September 1, 1927. Serial No. 216,993.

This invention relates to isolating supports for vibratory equipment, and to a method for precluding the telephonic transmission of vibrations from equipment into the structure in which it is supported or housed.

With the increasing use of machinery for various service purposes in private homes, apartments, hospitals, office buildings, etc., the prevention of transmission of vibrations from the machinery to the structures is becoming of increasing moment. The machinery, such for instance as, mechanical refrigeration plants, heating devices, pumps, generators, elevators and such affords many desirable advantages to the user but the advantages are at least obscured and frequently nullified by the nuisance factor of the vibrational noises originating in the machinery. Even with small motors and small machine units, vibrations originating in the motors, the machinery or both are normally telephoned or telephonically transmitted to the foundations or the structure, and find outlets of energy in resonating parts of the structure, such as floors or partitions with a consequent co-vibration of these parts with sufficient amplitude to generate sound waves in the air. Such vibrations are usually harmful to the structure, causing cracking and falling plaster, etc., to the machinery in which they arise, and in any case they form a nuisance, and an annoyance to the ear of even the hardiest individual. The factor of audible noise incident to the co-vibration of a favorably responsive portion of the structure economically is disadvantageous, in addition to the other undesirable factors noted, in that the renting or leasing of portions of the structure adjacent the responsive co-vibratory element of the building, is difficult, and sometimes impossible.

Of course, the problem has been recognized heretofore, and many active agencies have been and still are seeking a proper solution thereof, but so far as known, aside from the present invention, there has never been a completely and uniformly successful treatment for the problem.

Two modes of treatment have been resorted to. One is to sound-proof the room or structure in which the machinery is housed, in order to preclude the transmission of noise through the air. This is very rarely effective as the aerial sound given off by machinery is seldom evident at any great distance therefrom. The other mode, and the usual practice heretofore, is to interpose damping pads beneath the feed of the machine in an effort to preclude the telephonic transmission of vibrations through or into the structure. These, as such, are but rarely effective, for reasons to be recited later.

Assume an electric motor and a pump associated therewith for an illustration, although it will be clear that the type of machine, whether a small electric motor or a printing press or something in between has little to do with the problem as it is treated herein, and any source of vibrations is within the scope of applicability of the invention. There are numerous frequencies for vibrations emanating from such an assembly. There is in electrical machinery using alternating current a hum or buzz due to the alternations of current in the coils and armature of the motor. This is of relatively low frequency. The most potent factor in the problem, however, is unbalance or improper balance of the moving parts. Several elements enter into the vibrations due to unbalance as will be obvious, but in general, it will be clear that they will be of relatively high frequencies. The character of vibrations may vary from day to day and from hour to hour, in certain types of machinery, according to conditions. As noted therefore, the vibrations of such frequencies as may be transmitted, are radiated from the source into the structure or into the strata under the structure, to be telephoned into all parts of the structure, to become an active noise when any movable part of the structure acting as a diaphragm sets up co-vibrations of such amplitude as to cause sound waves in the adjacent air. This diaphragmatic action may take place at very remote points relative to source in the machinery. The solution lies in the proper remedy at the source of vibrations, as they cannot be controlled after reaching the structure itself.

Of the materials used heretofore for a supposed damping action in pads beneath the base or feet of machines, such as felt, lead, cork, etc., it is to be noted that their absorption varies both as to frequencies of vibrations which they may absorb, and further with two portions of similar material, such as two pieces of felt, which are apparently identical, the absorption may vary both as to frequencies absorbed and percentages of absorption.

The damping quality of a given material may be represented by the function $$\frac{F}{(2MC)^{\frac{1}{2}}}$$

where F is the frictional force, M the mass, and C the elasticity. Therefore it will be evident that materials that serve as effective vibration-damping elements have low coefficients of elasticity and are therefore easily compressed, are non-permanent, and are therefore incapable of supporting loads. Therefore where materials of this nature are interposed in the form of pads between machines and structure to damp out vibrations, the weight of the machine is usually sufficient of itself to compress the material which in the impacted condition thus created readily telephonically transmits a large proportion of the vibrations arising in the machine, into the foundation or structure. If on the other hand, the load is light in weight so that the material is not impacted to a condition of ready transmission of vibrations, then it is found normally that the moving machine is mechanically unstable.

Other attempts at isolating machines involve the use of flexible supports, steel springs, etc. Here, as before, if the damper still maintains a low coefficient of elasticity the installation is mechanically unstable and mechanically defective, causing danger, wear, etc. Steel springs transmit vibrations readily, especially those of the high frequency components. In those cases where stability has been sought by the use of tie-down bolts and similar mechanisms, it is to be noted that they are ineffectual to enhance stability unless appreciable pressure is applied to the machine, thus more certainly impacting the supposed damper with resultant free transmission of vibrations, as well as the certain effect of the free transmission of vibrations through the bolts or other restraining mechanisms. Such previous practice has not appreciated the necessity for, and has not accomplished any appreciable reduction of the unit implied force, and has but slightly increased the frictional force F of the damper.

Among the objects of this invention are; to provide an isolating support which reduces the unit implied force upon the structure; to provide an isolating support which maintains closely its original elasticity and remains continuously resilient; to transform from kinetic energy of vibrational force to other forms such as heat, those components of the initial implied forces which can become when transmitted to the structure, disturbing sound waves within the range of susceptibility of the ear; to diminish the vibrational kinetic energy so that it cannot impose vibrations of a degree of amplitude to any part of the structure that are mechanically dangerous to the structure; to provide an isolating damping treatment to moving equipment which precludes co-vibration of portions of the structure with moving equipment housed or supported in the structure; to provide an isolating support for moving equipment which prevents "weaving" of the equipment; to improve the damping qualities of equipment supports; to provide an isolating support for moving equipment which is unobtrusive and unobjectionable to the eye of an observer; to provide an isolating support for moving equipment which is mechanically stable but yet which precludes telephonic transmission of vibrations; to provide an isolating support for moving equipment which is permanent and which requires no adjustments during its use; to provide an isolating support which takes the place of the normal support for moving equipment whether for old or new installations; to reduce the maintenance cost of machinery by the provision of vibration damping means in association therewith; to increase the damping efficiency of materials used in isolating supports; to provide a permanent isolating support which is economical to install; to provide an efficient isolating support which affords a mechanically stable base for the equipment without the use of "hold-down" elements; and many other objects and advantages as will be more apparent as the description proceeds.

In carrying out the invention the unit implied force of the machinery is appreciably reduced so that the unit absorption of the damping elements need not be so high, and simultaneously the total load is so distributed that the damping elements are not unduly compressed or impacted and thus their absorption per unit remains high. Specifically a floating deck of appreciably greater area than the reflected normal machine support is provided upon which the equipment is mounted, which is imposed upon a stratified damping layer of similar area, to effect a mechanically stable support without tying the machine to the structure, as will become more clear as the description proceeds.

Figure 2:
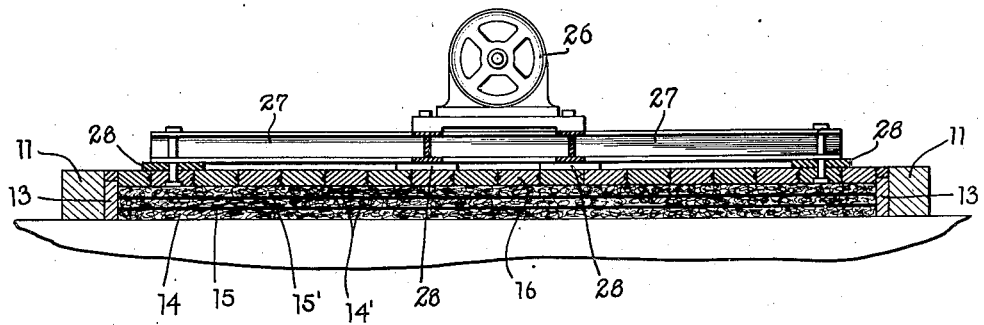
Figure 3:
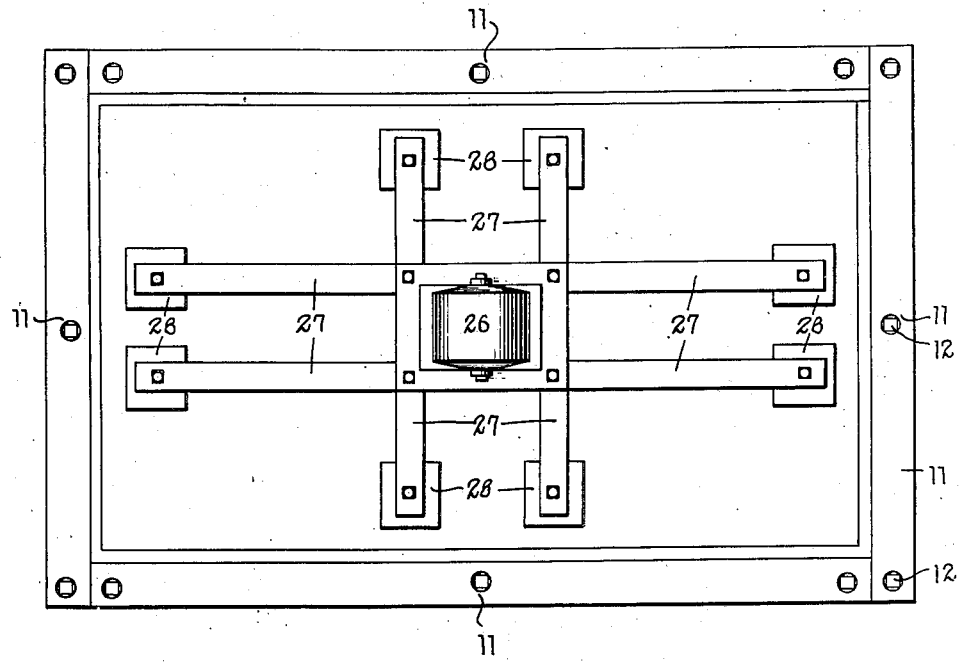

In the accompanying drawings,

Fig. 1 is a vertical section through an assembled support and a machine unit in accordance with the invention, Fig. 2 is a similar section through a slightly modified form of the invention, Fig. 3 is a top plan view of the assembled unit shown in Fig. 2, Fig. 4 is a diagrammatic view of an illustrative motor shown as having four feet supports, with legends showing the unit implied force on the common or normal support illustrated, and Fig. 5 is a diagrammatic view of an illustrative motor as indicated in Fig. 4, but mounted upon the isolating support of this invention, with arrows indicating the dispersion of forces, and with legends indicating the unit implied force present in this invention, in a purely illustrative form.

In practice it is found that most machinery of appreciable weight at the present time is mounted upon a concrete or similar rigid base in the basement of the structure housing it, which block may be mounted upon a pad of supposed absorbing material, and which may be spaced from the machine by pads of similar material. Such mountings are usual in view of the weight of the machinery, and of the stability afforded by the heavy concrete which effects a lowering of the center of gravity of the whole. Even with such heavy installations it is found necessary in many cases to tie or bolt the block to the foundation, and of course the machine must be tied or bolted to the block. Tie elements, whether rigid bolts, springs, or whatever form they may take, are excellent telephonic transmittters of vibrations. Furthermore, and of importance in considering the absence of any uniformly successful installations of this type, must be considered the high compression to which the supposed damping pads are subjected by the weight of the machine, and the weight of the machine and block. Clearly they are appreciably impacted so as to interpose substantially no frictional resistance to the telephonic transmission of vibrations of any frequency. Previous attempts to rectify the mistakes of original installations have taken the form, among others, of inserting additional pads between the parts, and of different materials, but which usually have no appreciable effect on the vibrations in the structure.

A phase of the problem may be better appreciated by reference to the drawings, in Fig. 4 of which a motor is diagrammatically indicated at X, having four supporting feet or lugs Z, mounted upon a base W. In the legends on the figure, it will be noted that P equals the total implied force, which is the total of all forces acting. The most prominent of these forces are; the dead load, potential; the live load, kinetic; and the forces of unbalance, magnetism and resonance. A is the area bounded by the motor supports that is, generally, the projected area of the machine. U, the unit implied force will then equal.

$$\frac{P/4x4}{A} = \frac{P}{A}.$$

The unit implied force in an installation indicated in this figure is therefore quite high, because computed around the compressive strength of iron or steel, the usual feet material and the direction of vibrations through the base through each foot is indicated. The compression factor on pads interposed beneath each foot will be obvious since the compressive strength of a cushioning material is much less than iron or steel. The proportion of P to A is such as to so crush the damping pad as probably to preclude its having any damping action whatever.

A more minute description will be given later, but it might be well to contrast the unit implied force of the common installation as shown in Fig. 4, with the sharply reduced unit implied force illustratively diagramed in Fig. 5 in accordance with the invention. In this figure, P′ is a total of all forces acting, as was P in Fig. 4; A′ is the area of the motor support in accordance with the invention herein, through the provision of a floating deck to be later described the area of which is, for illustrative and not limitative purposes, 50A. It will then be clear that U′, the unit implied force, in this instance will be $$\frac{P'}{A'} = \frac{P'}{50A} = .02U.$$

There are therefore two phases of the invention which serve to secure the desired result, one, in that the unit implied force is decreased so sharply as to be negligible, and the other that due to the reduction of unit implied force the damping materials are not appreciably affected by it so that their frictional resistance is not adversely affected. Either factor results in effective isolation of the machinery.

The invention may be practiced upon new installations or in rectifying errors in old installations, in which latter case the machinery may be removed or merely blocked up off of its old base while the new installation is made, if it is desired to maintain service during the change.

If the old base is a concrete block mounted upon the floor, it is cut away to the level of the floor or below this level if desired. In this connection it will be appreciated that in view of the numerous variants encountered in any installation over any other, that the mass, proportions, periods and frequencies of vibrations, the space in the clear directly over the machinery, the distance of bounding walls from the machinery, the variations in absorbing efficiencies of the several available damping elements, that a great deal must be known to the operator as to the reactions of the particular materials he is to use with relation to the conditions which he may find or encounter, which is determined largely by experience and experiment, and that the procedure, materials, and dimensions given herein as illustrative may vary within wide limits. It is not possible, so far as known at present to lay down exact formulæ and dimensions for a support that will be uniformly successful for every condition that may be encountered. Clearly the installation of isolating support that would be effective to silence the motor and compressor of a mechanical refrigerator, would be inadequate for a huge ammonia compressor in the basement of an apartment house. That installation which will preclude telephonically transmitted vibrations from a small electric fan would clearly be inadequate for the same purpose with a printing press. The distinctions in the problems to be encountered must therefore be borne in mind, although the principle involved and claimed remains the same.

Referring now to the drawings, in Fig. 1, it will be noted that holes 10 may be drilled or otherwise formed in the floor, in each of which a block of wood is anchored flush with the floor, as by grouting with fluid cement, if the floor is a rigid concrete one, as in the basement of a building. If it is an ordinary wooden floor the curbs to be described may be attached directly to such floor in the most convenient manner. To the blocks thus set, the curb 11 is affixed as by screws 12 the heads of which are recessed in the upper face of the curb. The curbs preferably delineate a rectangular space although it may be any shape desired, preferably equally spaced from the center of the machinery to be isolated, at points or lines usually as remote from the machinery as possible. If necessary the walls of the room may be used as curbs. The curbs may be made of any desired material, but it is preferred that they be wooden, of such elevation from the floor as the particular installation may seem to require, from say 4" to 10" in height, to accord with the thickness of damping materials used, to be described. In the illustrative case shown in the drawings, and which has given perfect results in use, the area bounded by the curbs and a lining to be mentioned later is fifty times as great as the effective area of the machine or machinery. Assuming that there are four legs or supporting feet on the machine, the area of the base delineated by the lined curbs will be fifty times the areas of the area bounded by the four feet of the machine provided the machine is designed in accordance with recognized standards. As noted this curb defined area need not be rectangular, although it is the easiest form of work.

The curb, whatever its height, is lined with a layer of damping material of a low coefficient of elasticity, such for instance as felt, machinery cork, etc., as shown at 13, which may be of such thickness as desired, although 2" is usually sufficient.

In the well thus formed, and it may be formed by simply recessing the floor to the desired distance with the side walls of the recess acting as curbs lined as before, a strata or layer of a low coefficient of elasticity is placed imposed upon the floor of the well, as at 14. This material may also be machinery cork, felt, etc., and has a sliding abutting fit with the linings of the curb so that lateral shifting movement is prevented, the curb and its lining restraining such movement. It will be clear that the strata 14 is of such area as to cover the floor of the well. Upon this strata a layer 15 of the same area is imposed, of a refracting material such as paper, sheet iron, composition board, etc. The refracting effect requiring that the sheet 15 be of a different density than the layer or strata 14, the sharper the difference, the greater the refracting effect. The refracting material disrupts or interferes with the transmission of vibrations, in which it has an action similar to the action of a refracting material upon light rays. The sound waves, or sonorous vibrations passing through a layer of material of a given density through a layer of appreciably different density are broken up, some are reflected back toward their source, some are changed in length, etc.

Upon this refracting layer 15, an additional layer or strata of damping material 14' is imposed, and then on the latter an additional refracting layer 15' is placed, as many layers of damping and refracting materials being used as the circumstances indicate, until the well is filled to within several inches from the top of the curb lining. The top of the curb lining is recessed a trifle below the top of the curb edge so as to permit adequate waterproofing, to be later described.

A rigid, floating deck is provided of such area as to extend across the entire upper area of the upper layer of damping material, of such thickness as to lie substantially in the plane of the upper edge of the curb lining. The floating deck may be formed as desired, and of a wide range of materials. For instance it may be a casting of metal or other material, it may be a preformed concrete slab or deck, etc., but it is preferred that it be made of wood, as this material is cheap, easily worked, and is possessed of a certain measure of damping quality of itself. A practical and useful deck is formed by two layers of 2 x 6 planks, the elements at right angles to each other, and rigidly bolted or cleated together to form a rigid unit in a plane. It should be plane so as to be in contact with the entire area of the upper damping layer, which is a plane surface. In any case it should be of such surface formation as to be in contact with the entire surface of the damping layers. The deck 16, as shown in Fig. 1, rests upon the upper strata of the damping material and its weight is imposed through the several layers of damping and refracting materials, and evenly distributed upon the floor or supporting strata beneath the absorbing elements, at the bottom of the well. It is to be noted that the deck 16 rests upon the damping material without pull down or tie bolts or other restraining devices so that it really floats upon the absorbing material without the compressing action on the damping materials that such tied or pulled down action would have. In effect the weight of the machine is reduced by cushioning it on air, the air entrapped in the large area of damping materials, effecting a reduction in the gravitational force with respect to the structure, seemingly. The lighter the machine with respect to the structure, the less intense the disturbance effect. Of course there is no effect whatever on the actual weight of the machine, but the actions incident to the mounting noted is as though there had been a decrease in the weight. The deck cannot move upwardly because of its weight, and that of the later added machine and supplemental decks noted below, it cannot move downwardly owing to the elasticity of the damping materials, and it cannot move laterally because of the restraining action incident to the engagement slidably of the edges of the deck with the lining of the curbs. The downward movement of the deck is insignificant and after its position is taken it moves down no further with use, due among other factors to the great expanse of material through which the implied load is distributed. It will be clear that with a machine mounted upon the deck the "weaving" noted in other machines with flexible bases or supports, is absolutely precluded, as there is no way in which the deck and the attached machine can move laterally on the damping material.

Upon the deck 16, but of smaller area than that deck, a secondary deck 17 may be centered, but spaced therefrom by a pad of damping material 18, such as felt, lead, rubber, cork etc., and which may be fastened to the primary deck 16, by properly spaced or placed bolts 20, extending between the primary and secondary decks.

Upon the secondary deck 17, smaller decks 21 and 22 may be placed, separated by insulating or damping pads 23 and 24, and bolted respectively to the secondary deck 17, and the feet 25 of the machine 26, as shown in Fig. 1.

As shown in Figs. 2 and 3, the machine 26 may be mounted upon girders or I beams 27, extending from the machine outwardly toward the outer edges of the deck 16, and spaced therefrom by pads or bearing plates 28, upon which the rigid frame work and rigidly attached machine are supported, and held to the deck by appropriate bolts extending between the frame work and the deck. The damping pads 28 may be of lead, or other material.

The effectiveness of the installations in accordance with the invention is indicated by the contrast between Figs. 4 and 5. In the former it will be noted that the total implied force passes directly downward through the several legs, so that the unit implied force on the supposed damping material is so high that but a small portion, if any, of the vibrations can be absorbed. Whereas in Fig. 5, the total implied force is dispersed or spread over the entire area of the supporting damping material so that the unit implied force is sharply reduced, with a resultant absorption of the entire series of vibrations. The dispersion of the total load over the large supporting area precludes such compression of the damping materials as to affect their absorbing properties. It is further to be noted that the stratified damping element is of appreciably greater damping efficiency than the same thickness of a single material, owing to the action of the refracting elements.

It is to be noted that if supporting columns are disposed in such near position to the machine as to be encompassed by the treatment set forth herein, they are treated as curbs. That is they are lined with a lining material as are the curbs, and the deck is arranged to pass around the column about its lining.

After the deck is imposed upon the supporting damping material, the whole assembly is waterproofed, as by a pitch and asbestos fiber composition, as is the structure immediately beneath the machine in Fig. 1, so that water or moisture may not enter to affect the qualities of the damping material. When so treated a substantially permanent isolating support is had.

I claim as my invention:

1. An isolating support for vibratory equipment adapted to rest on a floor having retaining means permanently and rigidly affixed to the floor and defining an area far greater than the normal supporting base of an item of equipment, damping material imposed upon the floor within the boundaries of the retaining means in intimate bearing association with the floor throughout the defined area but independent and detached therefrom, a rigid deck imposed upon the upper surface of the damping material in intimate bearing association with the damping material throughout its area, the damping material and deck being independent and detached except for gravitational forces, but held against lateral shifting motion by the retaining means, the deck arranged to support an item of vibratory equipment, such vibratory equipment being out of contact with the floor except through its association with the damping material.

2. An isolating support for vibratory equipment comprising in combination a floor having rigid curbs above the level of the floor, the curbs defining an area far greater than the area of the base of the vibratory equipment, a layer of damping material extending generally vertically in parallel contacting association with the curbs as a lining therefor, alternate layers of damping and refracting materials imposed on the floor and adjacent layers in sliding relation to the lining of the curbs and extending over the entire area within the curb lining, an inflexible deck of the same area as the damping materials and vertically slidable relative the curb lining, the deck and the damping and refracting materials being detached and disconnected except for gravitational forces maintaining their vertical association, and held against horizontal shifting motion by the curb and its lining, whereby the deck is supported upon the damping material.

3. In isolating supports, a layer of damping material, a subbase for a machine of the same area, substantially, as the damping layer, the subbase and damping layer having a large area relative to the combined weight of a machine to be supported and the subbase so that the weight per unit of area is insufficient to reduce appreciably the damping efficiency of the material.

4. In isolating supports, a layer of damping material, a subbase for a machine of the same area, substantially, as the damping layer, the subbase and damping layer having a large area relative to the combined weight of a machine to be supported and the subbase so that the weight per unit of area is insufficient to reduce appreciably the damping efficiency of the material, and means to hold the subbase upon the damping layer without direct connection therebetween.

5. In a mounting for a vibratory element, a deck of far greater area than the normal area of the base of the element, layers of damping material adapted to rest on a support having restraining means forming a well of the same area as the deck, the deck being of such area as to provide a stable support for the machine on the damping material without direct connection from the element or deck to the support.

In testimony whereof I affix my signature.

MAURICE C. ROSENBLATT.